United States Patent
Mathy et al.

(10) Patent No.: US 12,516,566 B2
(45) Date of Patent: Jan. 6, 2026

(54) FIRE RESISTANT VACUUM INSULATING GLAZING

(71) Applicants: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventors: Bertrand Mathy, Gosselies (BE); Thomas Lescot, Reves (BE); Julien Jeanfils, Walhain (BE)

(73) Assignees: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 533 days.

(21) Appl. No.: 17/769,140

(22) PCT Filed: Oct. 2, 2020

(86) PCT No.: PCT/EP2020/077749
§ 371 (c)(1),
(2) Date: Apr. 14, 2022

(87) PCT Pub. No.: WO2021/073904
PCT Pub. Date: Apr. 22, 2021

(65) Prior Publication Data
US 2022/0403697 A1    Dec. 22, 2022

(30) Foreign Application Priority Data

Oct. 18, 2019   (EP) ..................................... 19204182
May 14, 2020   (EP) ..................................... 20174653

(51) Int. Cl.
*E06B 3/67*    (2006.01)
*B32B 7/027*   (2019.01)
(Continued)

(52) U.S. Cl.
CPC ............ *E06B 3/6715* (2013.01); *B32B 7/027* (2019.01); *B32B 7/12* (2013.01);
(Continued)

(58) Field of Classification Search
CPC .. E06B 3/6715; E06B 3/6612; E06B 3/66304; E06B 3/6722; B32B 7/027;
(Continued)

(56) References Cited

U.S. PATENT DOCUMENTS

2012/0222373 A1*  9/2012  Bouesnard ............. C03C 27/10
                                              52/204.593
2015/0360446 A1* 12/2015  Schwankhaus ... B32B 17/10761
                                              264/261
2020/0040570 A1   2/2020  Cook et al.

FOREIGN PATENT DOCUMENTS

CN      101725307 B     5/2012
EP      2 308 675 A1    4/2011
(Continued)

OTHER PUBLICATIONS

Translation to English of WO2017211637A1 via espacenet. accessed Jun. 27, 2024. (Year: 2017).*

(Continued)

*Primary Examiner* — Donald M Flores, Jr.
(74) *Attorney, Agent, or Firm* — Oblon, McClelland, Maier & Neustadt, L.L.P.

(57) ABSTRACT

A fire resistant vacuum insulating glazing assembly with at least one vacuum insulating glazing unit having first and second glass panes; a set of discrete pillars between the glass panes; a hermetically bonding seal sealing the distance (Continued)

between the glass panes; an internal volume defined by the glass panes and closed by the hermetically bonding seal, wherein there is a vacuum of absolute pressure of less than 0.1 mbar. The inner pane faces face the internal volume, and the glazing assembly further includes at least one intumescent unit having a layer of intumescent material, an intumescent unit glass pane, and an intumescent unit peripheral spacer. The intumescent unit glass pane and the intumescent unit peripheral spacer define an intumescent unit volume, and the layer of intumescent material and the intumescent unit peripheral spacer face one of the outer pane faces of the first or second glass panes.

21 Claims, 2 Drawing Sheets (51) Int. Cl.
    *B32B 7/12*         (2006.01)
    *B32B 17/10*       (2006.01)
    *B32B 37/24*       (2006.01)
    *E06B 3/66*        (2006.01)
    *E06B 3/663*       (2006.01)

(52) U.S. Cl.
    CPC .. *B32B 17/10055* (2013.01); *B32B 17/10128* (2013.01); *B32B 17/10311* (2013.01); *B32B 17/10678* (2013.01); *B32B 37/24* (2013.01); *E06B 3/6612* (2013.01); *E06B 3/66304* (2013.01); *B32B 2250/04* (2013.01); *B32B 2250/05* (2013.01); *B32B 2250/44* (2013.01); *B32B 2307/3065* (2013.01); *B32B 2307/732* (2013.01); *B32B 2315/08* (2013.01); *B32B 2398/00* (2013.01); *B32B 2419/00* (2013.01)

(58) Field of Classification Search
    CPC ................ B32B 7/12; B32B 17/10055; B32B 17/10128; B32B 17/10311; B32B 17/10678; B32B 37/24; B32B 2250/04; B32B 2250/05; B32B 2250/44; B32B 2307/3065; B32B 2307/732; B32B 2315/08; B32B 2398/00; B32B 2419/00; B32B 17/069; B32B 17/10091; B32B 17/10137; B32B 17/10174; B32B 17/10302; B32B 17/1055; B32B 17/10743; B32B 17/10761; B32B 17/1077; B32B 17/10779; B32B 17/10788; Y02A 30/249; Y02B 80/22
See application file for complete search history.

(56) References Cited

FOREIGN PATENT DOCUMENTS

| | | | |
|---|---|---|---|
| EP | 3 156 580 A1 | 4/2017 | |
| EP | 3 527 365 A1 | 8/2019 | |
| WO | WO-2009007452 A1 * | 1/2009 | ........... B32B 17/069 |
| WO | WO-2012126127 A1 * | 9/2012 | ........... E06B 3/6612 |
| WO | WO-2017211637 A1 * | 12/2017 | ........... B32B 17/069 |

OTHER PUBLICATIONS

Translation to English of WO2009007452 A1 via the FIT database. accessed Jun. 27, 2024 (Year: 2009).*
[NPL-1] Staufert et al. (WO 2012/126127 A1); Sep. 27, 2012 (EPO machine translation to English). (Year: 2012).*
[NPL-2] Boucher et al. (WO 2017/211637 A1); Dec. 14, 2017 (EPO machine translation to English). (Year: 2017).*
International Search Report issued Oct. 30, 2020 in PCT/EP2020/077749 filed Oct. 2, 2020, 3 pages.

* cited by examiner

FIRE RESISTANT VACUUM INSULATING GLAZING

1. FIELD OF THE INVENTION

The present invention relates to fire resistant glazings with improved thermal performance.

2. BACKGROUND OF THE INVENTION

Fire resistant glazings are well known in the art and are designed to meet well-defined specifications, including standards such as European standards EN 1363-1 and 1364-1 for walls, or 1634-1 for doors and windows. These characteristics are of course aimed at the properties of fire resistance, but further technical characteristics must be added to meet the requirements of the users and/or the modes of manufacture.

One way of constructing fire resistant glazing is to assemble several panes of glass separated by layers of intumescent materials. The weight and thickness of fire resistant glazings may become high depending on the fire resistance performances level required, that defines the number of glass panes and layers of intumescent material. The latter are most often composed of hydrated alkali metal silicates, organic hydrogels may alternatively be used such as described for instance in WO2014190444. These materials under the effect of heat expand by forming a foam opaque to infrared radiation, that keeps the glass walls in position even when the latter are fragmented under the effect of heat.

The use of hydrated alkali metal silicates in the manufacture of fire resistant glazings is mainly carried out according to two distinct modes.

In the first mode known as the "drying process", the layer of intumescent material is obtained by applying solutions of these silicates over a glass pane and by carrying out a more or less prolonged drying step until a solid layer is obtained. Several assemblies layer/glass pane can be piled up to obtain products having the desired fire resistance performances. The last layer of silicate formed is covered by a final glass pane.

A second mode, known as the "cast-in-place process", relates to products in which a silicate solution is modified by the addition of products qualified as "hardeners", "cross-linking agents" or in yet another way. These qualifications generically denote products which promote gelling of the silicate solution. They are chosen carefully so that, after their addition to the silicate solution, the latter, when left at rest, spontaneously hardens over a relatively short time, without it being necessary to carry out a drying step.

For these products, before formation of the gel, the solution and its eventual additives, is poured in a cavity between two glass panes. The glass panes are joined at their periphery by a spacer which keeps them at a distance from each other, and which, with the two glass panes, defines a leak tight cavity in which the solution is poured. The fire resistant glazings obtained by this second mode comprise a peripheral spacer encompassing the intumescent layer and consequently the layer of intumescent material does not extend up to the edges of the glass panes.

The products obtained by this second mode are generally characterized by thicker intumescent layers having higher water contents. Consequently, one drawback is the poor resistance to low and high temperatures of the products obtained. At low temperature such as −10° C. and less, the typical fire resistant materials (hydrated alkali metal silicates) freeze, leading to an irreversible damage of their optical quality (bubbles, cracks) . . . . At high temperature such as 40° C. and more, the stability of the intumescent layers, whose water content is high, tends to deteriorate and the intumescent layers tend to creep under their own weight, thereby deforming the fire-resistant glazing. Furthermore, at such high temperatures, the optical properties of the intumescent layers may be altered upon ageing. Therefore, the use of such fire resistant glazings are limited for outside applications.

To protect the intumescent materials from cold temperature, antifreeze materials are typically added to intumescent materials, such as ethylene glycol or glycerin. However, their concentration has to be limited as their presence significantly alters the fire performances. In consequence of this limitation, the use of fire resistant glazings obtained by the cast-in-place mode remains limited at low temperatures.

Nowadays, in order to respond to the climate change, current market trend is to increase the thermal performance of buildings wherein glazing is an important part thereof. Hence, there is a need to design fire resistant glazings that demonstrate improved thermal performance.

One solution to increase the thermal performance is to include the fire resistant glazing into a double glazing system. However such systems raise several technical issues.

A first issue in designing a fire resistant glazing into a double glazing is that it increases even further the total thickness and the weight of the glazing. Therefore, it becomes even more difficult to handle and frame those glazing.

Moreover, the design of fire resistant double glazing requires by definition, the use of a double glazing peripheral spacer. However, common double glazing peripheral spacers are not preferred in fire resistant applications which require specific spacers that resist properly to the fire conditions, such as stainless steel spacer. Such spacers do demonstrate poor thermal sealing and therefore substantially decrease the overall thermal performance of the window.

It has been found that designing fire resistant glazing into double glazing does not provide the necessary thermal protection to the layer of intumescent material.

On the other hand, vacuum insulating glazing is a recent technology in the high insulating window market. Vacuum insulating glazing units are recommended because of their high-performance thermal insulation. A vacuum insulating glazing unit is typically composed of at least two glass panes separated by an internal space in which a vacuum has been generated. In general, in order to achieve a high-performance thermal insulation (Thermal transmittance, U, being $U<1.2$ W/m$^2$K) the absolute pressure inside the glazing unit is typically 0.1 mbar or less and generally at least one of the two glass panes is covered with a low-emissivity layer. To obtain such a pressure inside the glazing unit, a hermetically bonding seal is placed on the periphery of the two glass panes and the vacuum is generated inside the glazing unit by virtue of a pump. To prevent the glazing unit from caving in under atmospheric pressure (due to the pressure difference between the interior and exterior of the glazing unit), discrete spacers are placed between the two glass panes.

However, none of the art addresses the technical problem of providing a fire resistant glazing demonstrating highly superior thermal performance allowing to avoid its thermal sensitivity at low and high temperatures and to avoid the technical issues of double glazing.

3. SUMMARY OF THE INVENTION

Against this background, we hereby provide a fire resistant vacuum insulating glazing assembly comprising:

i. at least one vacuum insulating glazing unit comprising:
   a. a first glass pane, GP1, having an inner pane face and an outer pane face and a second glass pane, GP2, having an inner pane face and an outer pane face;
   b. a set of discrete pillars positioned between the first and second glass panes, maintaining a distance between the first and the second glass panes;
   c. a hermetically bonding seal sealing the distance between the first and second glass panes over a perimeter thereof;
   d. an internal volume, V, defined by the first and second glass panes and closed by the hermetically bonding seal, wherein there is a vacuum of absolute pressure of less than 0.1 mbar; and wherein the inner pane faces face the internal volume, V;
and
ii. at least one intumescent unit comprising:
   a layer of intumescent material;
   an intumescent unit glass pane, GPiu;
   an intumescent unit peripheral spacer extending over a perimeter of the intumescent unit glass pane;
   wherein the intumescent unit glass pane and the intumescent unit peripheral spacer define an intumescent unit volume, Vi, encompassing the layer of intumescent material, and
   wherein the layer of intumescent material and the intumescent unit peripheral spacer are facing one of the outer pane faces of the first or second glass pane.

The present invention further relates to a fire resistant vacuum insulating assembly wherein the layer of intumescent material, is obtained by a process comprising the steps of:
preparing an intumescent material precursors mixture,
optionally partially dehydrating the mixture,
pouring the mixture into the intumescent unit volume, Vi,
hardening the mixture to form the layer of intumescent material.

5. DETAILED DESCRIPTION OF THE INVENTION

The present invention relates to a "fire resistant vacuum insulating glazing assembly". Such object is hereinafter equally referred as a whole to "FR-VIG". It comprises a vacuum insulating glazing unit hereinafter equally referred to as "VIG" and one or more intumescent unit(s) hereinafter equally referred to as "IU".

The object of the invention is to provide a fire resistant glazing that demonstrates improved thermal performance, while minimizing its weight and thickness and increasing its resistance to low and high temperatures and its sustainability.

It has been surprisingly found that the FR-VIG of the present invention demonstrates superior thermal performance while avoiding the technical drawbacks of the double glazing system. It avoids the loss of thermal performance due to the poorly performing standard double glazing peripheral spacer, when metal spacers are used. Furthermore, it protects the layer of intumescent material from cold temperature, below −10° C., and even more from high temperatures, above 40° C. Indeed, the layer of intumescent materials are sensitive to low temperatures and even more to high temperatures. At high temperatures, even when hardened, the stability of the intumescent layers, whose water content is high, tends to deteriorate and the layers of intumescent material tend to creep under their own weight, thereby deforming the fire-resistant glazing. It is particularly troublesome when hydrated alkali metal silicates are used. Furthermore, at such high temperatures, the optical properties of the intumescent layers may be altered upon ageing. It has been surprisingly found that the use of a vacuum-insulating glazing does provide protection against cold and even more high temperature, thereby avoid creeping of the layer of intumescent material and providing improved optical stability over time. Hence, the FR-VIG of the present invention allows to increase substantially the life of the fire-resistant glazing as well as extends the geographical use of such FR-VIG, no more limited to countries with medium temperature profiles.

Moreover, thanks to the substantial thickness reduction of the FR-VIG, there is a substantial reduction of its weight and easier handling, a substantial reduction of the frame dimension; all providing substantial cost savings. Moreover, in some specific applications with very high fire resistance performance and/or high thermal performance, no compatible frame are currently existing. The present invention therefore provides a technical solution to such particular FR-VIGs. Furthermore, the width of the rabbet of the corresponding frame can be similarly reduced and therefore it improves retaining and preservation of the glazing assembly integrity when exposed to a fire hazard.

The glass panes suitable for the present invention can be of any type such as float glass panes or alternatively cast or drawn glass panes and can be chosen among all glass technologies such as: float clear, extra-clear or colored glass, (partially) acid etched or (partially) sand blasted glass and combinations thereof. The glass may be a soda-lime-silicate glass, an alumino-silicate glass, an alkali-free glass, a borosilicate glass and the like. It may be a clear, extra-clear/low-iron or colored glass sheet. Preferably, the glass panes of the invention are made of a soda-lime glass or of an alumino-silicate glass. Non-limiting examples of glass panes are Planibel® Clear, Linea Azzura®, Dragontrail®, Tirex®, Falcon®, Clearvision®, Clearlite®.

The glass panes can be at least partially coated. By partially coated is meant that at least a part of at least one of their faces can be coated with any suitable coating depending on the needs such as for instance a low-emissivity coating, a solar control coating, an enamel or any combinations thereof. In the particular case where a coating would be in contact with the layer of intumescent material, suitable coatings are those being compatible with the layer of intumescent material, for instance compatible with the strongly alkaline character of hydrated alkali metal silicate compositions.

Thermally treated or chemically tempered glass panes can be used. The thermally treated glass pane can be treated by any thermal treatment known by the skilled person such as heat strengthening (according to EN 1863-1:2011), thermal toughening (according to EN 12150-2:2015) or thermal toughening and heat soaking (according to EN 14179-2: 2005). The glass pane thermally treated according to these standards is suitable as safety glass. Chemical tempering is particularly suited for thin glass panes.

Preferably at least one of the glass panes in contact with the layer of intumescent material is a thermally treated glass pane, more preferably both glass panes in contact with the layer of intumescent material are thermally treated glass panes.

The fire resistant vacuum insulating glazing assembly comprises a VIG, which typically comprises a first glass pane, GP1, and a second glass pane, GP2, that are spaced apart by way of a set of discrete pillars, a hermetically bonding seal and an internal volume. The set of discrete pillars holds said panes a certain distance apart. This distance is typically in the range of between 50 μm and 1000 μm, preferably between 50 μm and 500 μm and more preferably between 50 μm and 150 μm. Between said glass panes, an internal volume, V, wherein there is a vacuum of absolute pressure of less than 0.1 mbar, is closed with a hermetically bonding seal placed on the periphery of the glass panes around said internal space.

The first and the second glass panes have each an inner pane face and an outer pane face. Each inner pane face faces the internal volume, V. In one embodiment, the thickness of the first glass pane, Z1, is identical to the thickness of the second glass pane, Z2, (Z1=Z2). In another embodiment, the thickness of the first glass pane, Z1, is greater or lower than the thickness of the second glass pane, Z2 (Z1>Z2 or Z1<Z2). The thickness of the first and/or second glass panes, Z1, Z2, of the VIG unit, are typically equal to or greater than 2 mm (Z1, Z2≤2 mm), preferably are equal to or greater than 3 mm, (Z1, Z2≤3 mm), more preferably equal to or greater than 4 mm, (Z1, Z2≤4 mm) more preferably equal to or greater than 6 mm, (Z1, Z2≤6 mm). Typically, the thickness of the first and second glass panes, will be not more than 12 mm, preferably not more than 10 mm, more preferably not more than 8 mm.

The VIG of the present invention comprises a plurality of discrete pillars, sandwiched between the first, GP1, and second, GP2, glass panes so as to maintain the internal volume, V. The discrete pillars are positioned between GP1 and GP2, maintaining a distance between them and forming an array having a pitch, it, comprised between 10 mm and 100 mm (10 mm×100 mm). By pitch, it is meant the interval between the discrete pillars. In a preferred embodiment, the pitch is comprised between 20 mm and 80 mm (20 mm×80 mm), more preferably between 20 mm and 50 mm (20 mm≤λ≤50 mm). The array is typically a regular array based on an equilateral triangular, square or hexagonal scheme, preferably based on a square scheme.

The discrete pillars can have different shapes, such as cylindrical, spherical, filiform, hourglass, C-shaped, cruciform, prismatic shape . . . . It is preferred to use small pillars, i.e. pillars having in general a contact surface to the glass pane, defined by its external circumference, equal to or lower than 5 mm$^2$, preferably equal to or lower than 3 mm$^2$, more preferably equal to or lower than 1 mm$^2$. These values may offer a good mechanical resistance whilst being aesthetically discrete. The discrete pillars are typically made of a material having a strength endurable against pressure applied from the surfaces of the glass panes, capable of withstanding high-temperature process such as burning and baking, and hardly emitting gas after the glass pane is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

The internal volume, V, delimited between the glass panes GP1, GP2 of the VIG is closed with a hermetically bonding seal placed on the periphery of the glass panes around said internal volume. The said hermetically bonding seal is impermeable and hard. The term "impermeable" is herein understood to mean impermeable to air or any other gas present in the atmosphere.

Various hermetically bonding seal technologies exist. A first type of seal (the most widespread) is a seal based on a solder glass for which the melting point is lower than that of the glass of the glass panes of the glazing unit. The use of this type of seal limits the choice of low-E layers to those that are not degraded by the thermal cycle required to implement the solder glass, i.e. to those that are able to withstand a temperature possibly as high as 250° C.

A second type of seal comprises a metal seal, for example a metal strip of a small thickness (<500 μm) soldered to the periphery of the glazing unit by way of a tie underlayer covered at least partially with a layer of a solderable material such as a soft tin-alloy solder. One substantial advantage of this second type of seal relative to the first type of seal is that it is able to partially deform in order to partially absorb the differential expansion created between the two glass panes. There are various types of tie underlayers on the glass pane.

Patent application WO 2011/061208 A1 describes one example embodiment of a peripheral impermeable seal of the second type for a vacuum insulating glazing unit. In this embodiment, the seal is a metal strip, for example made of copper that is soldered by means of a solderable material to an adhesion band provided on the periphery of the glass panes.

A vacuum of absolute pressure less than 0.1 mbar, preferably less than 0.01 mbar is created, within the internal volume, V, defined by the GP1 and GP2 and the set of discrete pillars and closed by the hermetically bonding seal within the VIG of the present invention. Energy transfer through a vacuum insulating glazing unit is greatly decreased by the vacuum. To generate the vacuum in the internal space of the glazing unit, a hollow glass tube bringing the internal space into communication with the exterior is generally provided on the main face of one of the glass panes. Thus, the partial vacuum is generated in the internal space by pumping out gases present in the internal space by virtue of a pump connected to the exterior end of the glass tube.

To maintain over time a given vacuum level in a vacuum insulating glazing unit a getter may be used in the glazing unit. Specifically, the internal surfaces of the glass panes making up the glazing unit may release over time gases absorbed beforehand in the glass, thereby increasing the internal pressure in the vacuum insulating glazing pane and thus decreasing the vacuum performance. Generally, such a getter consists of alloys of zirconium, vanadium, iron, cobalt, aluminum, etc., and is deposited in the form of a thin layer (a few microns in thickness) or in the form of a block placed between the glass panes of the glazing pane so as not to be seen (for example hidden by an exterior enamel or by a portion of the peripheral impermeable seal). The getter forms, on its surface, a passivation layer at room temperature, and must therefore be heated in order to make the passivation layer disappear and thus activate its alloy gettering properties. The getter is said to be "heat activated".

The FR-VIG of the present invention comprises at least one intumescent unit comprising an IU glass pane GPiu, an IU peripheral spacer and a layer of intumescent material.

By intumescent material is meant a material which will swell upon heating above a temperature of 100° C. The swelling is typically a consequence of the phase transition of the interstitial water from the liquid phase to the vapor phase within the intumescent material. The associated volume expansion of said water leads to the foaming of the gel. The thickness of the gel layer may thus increase by a factor ranging from two to a few dozen.

The GPiu and IU peripheral spacer define an IU volume, Vi. It is understood that Vi is the volume comprised between Gpiu and the extremity of the IU peripheral spacer opposite to the Gpiu. In other words, it is the volume comprised between Gpiu, the IU peripheral spacer and a surface parallel to GPiu comprising the face of the peripheral spacer opposite to the face of the peripheral spacer in contact with GPiu. Vi encompasses the layer of intumescent material, which is facing an outer pane face of GP1 or GP2 of the VIG. In other words, the layer of intumescent material does not face the exterior of the glazing. Furthermore, due to the presence of the IU peripheral spacer, the layer of intumescent material does not extend to the edges of the IU glass pane. An intumescent unit comprising a peripheral spacer encompassing the layer of intumescent material is typically obtained by the cast-in-place process.

The layer of intumescent material suitable for the invention typically has a thickness ranging from 2 to 30 mm. The thickness preferably ranges from 3 to 15 mm, more preferably from 3 to 8 mm. Below 2 mm, the fire resistance performances are limited and above 30 mm, further thickness does not bring any substantial addition of anti-fire performance but rather can cause more creeping disadvantage.

The layer of intumescent material may be a layer of hydrated alkali metal silicate composition. It may alternatively be a layer of organic hydrogel such as those described for instance in WO2014190444. Alternatively, the layer of intumescent material may also be a layer comprising both an organic hydrogel and hydrated alkali metal silicate composition present in the form of a mixture.

In a preferred embodiment of the invention, the layer of intumescent material is a layer of hydrated alkali metal silicate composition obtained from a hydrated alkali metal silicate based intumescent material precursors mixture also equally referred to as silicate based intumescent material precursors mixture.

The alkali silicates used in the hydrated alkali metal silicate compositions are generally chosen among potassium, sodium and/or lithium silicates. It is possible to have a mixture of these silicates in varying proportions. However, potassium silicates are preferred. Potassium silicates, for an identical SiO2/M2O ratio, have a higher foaming Tg than sodium silicates. Their use therefore favors fire resistant properties. In addition, they provide better transparency. Potassium silicates, particularly those formed synthetically by reaction of colloidal silica with potassium hydroxide, remain quite transparent regardless of the water content compared to the similar behavior of sodium silicates. Application opportunities are therefore larger with potassium silicates. It is also possible to use mixtures of potassium and sodium silicates. Such mixtures, however, lead to lower foaming Tg than those observed for potassium silicates only. The mixture for equivalent proportions of potassium and sodium silicates may even lead to a lower Tg than the two silicates used individually, the mixture is believed to form an eutectic system. Preferably, potassium silicates represent at least 60% by weight, more preferably at least 80% by weight of all the silicates. Preferred alkali metal silicates are mixtures of alkali potassium and sodium silicates, more preferably mixtures with more than 90% by weight of alkali potassium silicates and less than 10% by weight of sodium silicates.

The water content of the layer of intumescent material, impacts the "refractory" character of the layer, and partly conditions its fire resistance properties. To enhance this refractory character attenuated by this water content, it is preferable to choose compositions in which the SiO2/M2O molar ratio, M being an alkaline, potassium or sodium or a combination of the two, is relatively high (i.e. higher than 4). In a preferred embodiment, the layer of intumescent material is based on hydrated alkali metal silicates, preferably with SiO2/M2O molar ratio from 3 to 8, more preferably from 4 to 6, even more preferably from 4.5 to 5.3.

To prepare the silicate based intumescent material precursors mixture, it is preferred to start from suspensions of colloidal silica and alkaline hydroxide. The latter is either in the form of a solution or at least partly in the form of solid pellets to limit as much as possible the water content of the mixture.

If the silica suspensions do not ordinarily exceed 50% by weight of silica, the compositions obtained by reaction of these suspensions with the alkaline hydroxide may have a substantially lower water content than that of the industrial silicates and so with SiO2/M2O much higher ratios. If nevertheless for economic reasons, it is preferred to use, at least partially, industrial silicates, it remains necessary to modify them by a substantive addition of colloidal silica to achieve mixtures having the desired molar ratios without the need to eliminate an excessive quantity of water.

In addition, the hardening of the silicate based intumescent material precursors mixtures in which the use of silica suspension is involved, depends further, at least partly, on the size of the silica particles used. In general, an increase of the particles size-within certain limits, makes it possible to delay the caking of the mixture. Therefore, by increasing the silica particle size, a reduced water content can be obtained, while maintaining the required viscosity of the mixture for further processing. Typical water content for mixtures with silica of standard particle size, is 44%-55% by weight of the intumescent material precursors mixtures. Mixtures comprising silica having particles of increased dimensions, can achieve much lower water content, down to 30% by weight, while retaining the necessary rheological properties.

Obviously, the increase in particle size is limited since beyond a certain dimension, the mixtures no longer exhibit the required optical properties, and in particular transparency. Too large dimensions of the silica particles lead to a diffusion of light, and to the formation of a haze. In practice, the silica particles used for the formation of the silicate based intumescent material mixture have an average diameter of not less than 40 nm and preferably not less than 50 nm. These particles also have average dimensions which do not exceed advantageously 150 nm and preferably not 130 nm. The particularly preferred average diameter is between 60 nm and 120 nm.

Typically, the mixture of silicate based intumescent material precursors has a water content between 44% and 55% before any further optional dehydration step. The presence of this relatively abundant water can however lead to a lack of cohesion of the glazing. Subject to shear forces in the plane of the glazing, the glass panes, even at ordinary temperature, are likely to move against each other. Moreover, the high water content can also produce a very irregular "foam", detrimental to the integrity of the intumescent unit. High water content in the layer of intumescent material may require strengthening the edge protection to avoid alteration over time, consecutive for example to a progressive drying from these edges.

Therefore, such mixture will optionally go through a partial dehydration step to reach a water level content of 35% to 48%, preferably from 40% to 48% by weight, more preferably from 42% to 46% by weight of the mixture of silicate based intumescent material precursors, before being poured into the intumescent unit volume of the intumescent unit.

In addition to the silicates components and water, various additives may be used such as polyols, and in particular ethylene glycol or glycerol. Polyols are intended to compensate the lack of plasticity of the mixtures of intumescent materials and to improve the resistance to cold temperatures of the layer of hydrated alkali metal silicate compositions. Polyols are generally added at a concentration of less than 20%, preferably of less than 10% by weight, most preferably from 3% to 8% by weight of the layer of intumescent material. Preferred polyols are glycols, especially ethylene glycol and/or glycerin.

Other additives may be used in small proportions such as silicate stabilizing agents. These are nitrogen products (urea, amines . . . ) which stabilize the silicate network and favor the development of regular foams in case of fire, or surfactants which promote the wetting of the glass panes with which the intumescent alkali metal silicate composition is in contact.

Advantageously, the mixture contain tetra-methyl ammonium hydroxide (TMAH) at a content which is not greater than 2% by weight of the layer of intumescent material.

To improve the adhesion of the intumescent layer to the glass sheet, it is further possible, to introduce into the silicate based intumescent material precursors mixture, compounds promoting adhesion, such as for example, silanes and functionalized silanes such as amino-silanes.

The silicate based intumescent materials mixture is typically stabilized by the addition of "hardeners or crosslinking agents". By "hardeners or crosslinking agents" it is generically referred to products that promote the gelling of the silicate based intumescent material precursors mixture. The hardeners are specifically selected so that, after their addition to the silicate based intumescent material mixture, the mixture cures spontaneously in a relatively short time, without the need for drying. The absence of a drying step is a definite advantage since the layer of intumescent material does obviously retain a relatively high water content.

The intumescent material precursors mixture when prepared and ready to be poured in the into the intumescent unit volume, i.e. after optional partial dehydration, has a composition that is substantially the same as the composition of the layer of intumescent material obtained after hardening of the mixture. Indeed, substantially no drying of the mixture occurs after having it poured in the intumescent unit volume.

Therefore, the layer of intumescent material, typically the layer of hydrated alkali metal silicate has preferably a water content from 35% to 48% by weight of the layer, more preferably from 40% to 48% by weight, most preferably from 42% to 46% by weight. The layer of hydrated alkali metal silicate comprises polyols in a proportion of less than 20% by weight of the layer, preferably of less than 10% by weight, more preferably from 3% to 8% by weight. The layer of hydrated alkali metal silicate has a $SiO_2/M_2O$ molar ratio from 3 to 8, preferably from 4 to 6, more preferably from 4.5 to 5.3.

The intumescent unit comprises an intumescent unit peripheral spacer. The IU peripheral spacer extends over a perimeter of the GPiu and tightly adheres thereto. It defines together with the GPiu, an intumescent unit volume, Vi, that encompasses the layer of intumescent material. The IU peripheral spacer typically comprises an opening to allow pouring the intumescent material precursors mixture into the intumescent unit volume. This opening is sealed at the end of the fabrication process.

In its role of maintaining the layer of intumescent material within Vi, the IU peripheral spacer must of course provide proper tightness properties. It is further required that the material of the intumescent unit peripheral spacer should not be altered by the contact with the intumescent material precursors mixture nor the layer of intumescent material. In particular, it should not be altered by the hydrated alkali metal silicate composition known to be very strongly basic. The intumescent unit peripheral spacer must still strongly adhere to the glass panes to resist to the possible deformation of the FR-VIG due to the potential creeping of the layer of intumescent material over time.

Various solutions are proposed to form these intumescent unit peripheral spacers. It can for instance be a spacer made of a material having intrinsic tightness and adhesion properties such as a thermoplastic spacer or an extruded butyl rubber seal. This solution offers the advantage of allowing good adhesion to the glass panes, and to compensate for irregularities in the flatness of these panes, thus ensuring a good seal. They also offer the advantage to adapt to all possible shapes. To give such thermoplastic spacers or extruded butyl rubber seal a good UV resistance, and sufficient rigidity to maintain the distance between the glass panes, they are sometimes reinforced by various fillers, including carbon black, mineral powders such as glass powders.

The use of such spacers, however, does generally not completely prevent a reaction with the hydrated alkali metal silicate composition, and the possible formation of bubbles that affect the quality of the glazing. Silicone rubbers exist as alternatives to butyl rubbers for improved chemical resistance in contact with silicates.

Other suitable intumescent unit peripheral spacers of this type are described in WO2009/007452 wherein the spacer is made of a rigid or semi-rigid material resistant to alkali silicate, and forms a profile of which at least the parts facing the glass panes are coated with an adhesive also resistant to alkaline silicate.

Another solution is the use of spacers made of more rigid materials such as metal spacers. However, metal spacers have a thermal expansion coefficient that is substantially different from that of the glass panes and they have poor thermal performance. For this reason, the use of spacers made of ceramic material having a coefficient of expansion similar to that of glass panes may also be used. If transparency along edges is desired, the rigid spacer can be chosen among transparent polymer spacers such as those in polymethylmethacrylate (PMMA), polycarbonate, polystyrene, polyamide or polyester. Such spacers made of rigid materials require to be covered by adhesives based on butyl rubber, silicone or acrylic resins to tightly adhere to the glass panes.

In addition to the role of maintaining the layer of intumescent material within the intumescent unit volume, the intumescent unit peripheral spacer must also protect the layer of intumescent material against external influences which may alter the properties, especially the optical properties. Silicate components are sensitive to possible transfer of water from the outside atmosphere. A local modification of the water content of the silicate can cause the appearance of a haze at the periphery of the glazing. For this reason it is customary to cover the edge of the glazing with a material that prevents the passage of particular water vapor, such as a polyurethane, a silicone or a polysulfide material which adheres well to glass panes and is compatible with the other materials of IU peripheral spacer. The polysulfide is preferably chosen.

The present invention comprises in particular the following embodiments.

In a first particular embodiment of the invention, the present invention relates to a FR-VIG comprising a single intumescent unit wherein the layer of intumescent material and the IU peripheral spacer are facing and are in contact with one of the outer pane faces (12,22) of GP1 or GP2. In this embodiment, the layer of intumescent material and the IU peripheral spacer are hence in contact with the outer pane face of GP1 or in contact with the outer pane face of GP2.

As used in the present invention, the wording "in contact with" does not preclude the presence of a coating such as those described supra (such as low-emissivity, solar control coating, enamel) or of an adhesion promoter on the surface of the glass pane, which are herein considered to be part of the glass pane.

Figure 1:
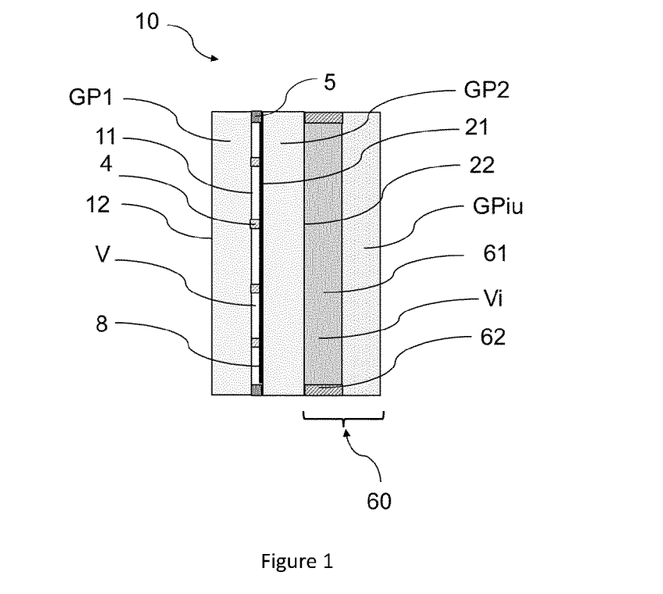
FIG. 1 shows a cross sectional view of a fire resistant vacuum insulating assembly according to one embodiment of the present invention, comprising one vacuum insulating glazing unit and one intumescent unit.

FIG. 1 provides an illustration of this embodiment wherein a FR-VIG (10) comprises a VIG and one IU (60). The VIG comprises a GP1 having an inner pane face (11) and an outer pane face (12) and a GP2 having an inner pane face (21) and an outer pane face (22). The inner pane face (21) of GP2 is provided with a coating (8). The VIG further comprises a set of discrete pillars (4) positioned between GP1 and GP2, maintaining a distance between them and a hermetically bonding seal (5) sealing the distance between GP1 and GP2 over a perimeter thereof. An internal volume, V, is defined by GP1 and GP2 and closed by the hermetically bonding seal. The inner pane faces (11,21) face the internal volume, V. The intumescent unit (60) comprises a layer of intumescent material (61) that is in contact on one side with the outer pane face (22) of GP2 and on the other side with the intumescent unit glass pane (GPiu). The layer of intumescent material (61) is encompassed by Vi that is defined by the peripheral spacer (62) and GPiu.

In a variant of this embodiment, the FR-VIG in addition comprises another intumescent unit wherein the layer of intumescent material and the IU peripheral spacer are facing and are in contact with the other one of the outer pane faces of GP1 or GP2. In this particular case, each of outer pane faces of GP1 and GP2 is in contact with an intumescent layer and an intumescent unit peripheral spacer. In other words, the FR-VIG comprises an intumescent unit on each side of the VIG.

In a second particular embodiment of the invention, the layer of intumescent material and the IU peripheral spacer are separated from the outer pane face (12,22) of the first GP1 or second GP2 glass pane by an additional glass pane, GP3, laminated by a polymer interlayer to said outer pane face. The layer of intumescent material is still facing the outer pane face of GP1 or GP2 but contrarily to the previous embodiment, the layer of intumescent material is herein separated from the outer pane face of GP1 or GP2 by a polymer interlayer and GP3.

This construction allows to join an existing VIG component to an existing fire resistant glazing comprising an intumescent material between two glass sheets (here GPiu and GP3), optionally in a location which is the same or different from where the individual components are being processed.

The advantage of such construction includes the reaching of a higher class of safety glazing by the mechanical reinforcement of the glazing according to EN12600 (European Standard for Safety Glazing). A further advantage is the improved absorption of the mechanical stress between the components in case of warpage.

The polymer interlayer to be used in this embodiment typically comprises a material selected from the group consisting of ethylene vinyl acetate (EVA), polyisobutylene (PIB), polyacetals such as polyvinyl butyral (PVB), polyurethane (PU), polyvinyl chloride (PVC), polyesters, cyclo olefin polymers (COP), ionomers and/or an ultraviolet activated adhesives, and others known in the art of manufacturing glass laminates. Blended materials using any compatible combination of these materials can be suitable as well. Preferably, the polymer interlayer comprises a material selected from the group consisting of ethylene vinyl acetate and/or polyvinyl butyral. More preferably, the polymer interlayer comprises a material capable of being processed at lower pressure, such as ethylene vinyl acetate.

The polymer interlayer acts as a "bonding interlayer" since the polymer interlayer and the glass pane form a bond that results in adhesion between the glass pane and the polymer interlayer.

The polymer interlayer to be used in the present invention may be a transparent or translucent polymer interlayer. However, for decorative applications, the polymer interlayer may be colored or patterned.

Typical thicknesses for the polymer interlayer are 0.15 mm to 3.5 mm, preferably 0.30 mm to 1.75 mm, more preferably from 0.5 mm to 1.75 mm. Usual commercially available polymer films are polyvinyl butyral (PVB) layers of 0.38 mm and 0.76 mm, 1.52 mm, 2.28 m and 3.04 mm. To achieve the desired thickness, one or more of those films can be used.

Reinforced acoustic insulation can be provided by using a polymer interlayer with specific acoustic performance, such as specific PVBs, is used: e.g. Saflex® acoustic PVB interlayer from Eastman or Trosifol® acoustic PVB layer from Kuraray.

By appropriately selecting the polymer interlayer, UV protection of the intumescent material may also be provided.

If several polymer interlayers are present in the FR-VIG, they can be made of the same or different materials. For practical reasons, they preferably are made of the same material.

Figure 2:
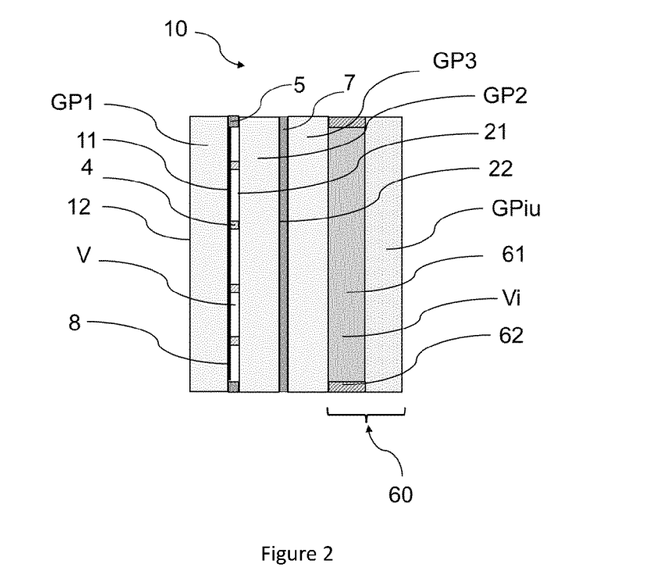
FIG. 2 shows a cross sectional view of a fire resistant vacuum insulating assembly according to one embodiment of the present invention, comprising one vacuum insulating glazing unit, an additional glass pane laminated to the vacuum insulating glazing unit and one intumescent unit.

FIG. 2 provides an illustration of this embodiment wherein a FR-VIG (10) comprises a VIG, one IU (60) as already described with reference to FIG. 1, but here a coating (8) is provided on the inner pane face (11) of GP1. The FR-VIG further comprises an additional glass pane GP3 and a polymer interlayer (7). The glass pane GP3 is on one side, laminated to the outer pane face (22) of GP2 of the VIG and on the other side, is in contact with the layer of intumescent material (61) of the IU and with the IU peripheral spacer (62). The layer of intumescent material (61) is encompassed by Vi that is defined by the peripheral spacer (62) and GPiu.

In a variant of this second embodiment, the FR-VIG in addition comprises another intumescent unit wherein the layer of intumescent material and the IU peripheral spacer are facing the other one of the outer pane faces of GP1 or GP2 and are separated therefrom by an additional glass pane laminated by a polymer interlayer to said outer pane face. In other words, the FR-VIG comprises on each side of the VIG an intumescent unit, an additional glass pane and a polymer interlayer.

A third particular embodiment of the invention is a combination of the two first embodiments wherein the VIG of the FR-VIG is surrounded by an intumescent unit on each side. On one side, one of GP1 or GP2 has its outer pane face in contact with the layer of intumescent material and with the peripheral spacer of the first intumescent unit and on the other side, the other one of GP1 or GP2 has its outer pane face separated from the layer of intumescent material and from the peripheral spacer of the second intumescent unit by a glass pane laminated by a polymer interlayer to said outer pane face.

In a fourth particular embodiment of the invention that is also applicable to the three preceding ones, the FR-VIG further comprises at least one additional intumescent unit wherein the intumescent layer and the IU spacer of the additional intumescent unit are facing the IU glass pane of the preceding intumescent unit. The additional intumescent unit may be facing the IU glass pane of the preceding intumescent unit and be in contact with it, or it can be facing the IU glass pane of the preceding intumescent unit and be separated from it by an additional glass pane laminated by a polymer interlayer to said IU glass pane. The FR-VIG in this embodiment may also comprise several additional intumescent units. When the FR-VIG comprises several intumescent units, the anti-fire performances of the FR-VIG advantageously improve with an increasing number of intumescent units, however the thickness and the weight of the FR-VIG also increase and the right balance has to be achieved depending on the needs. In the present embodiment, the number of IU typically ranges from 2 to 6, preferably from 2 to 4.

Figure 3:
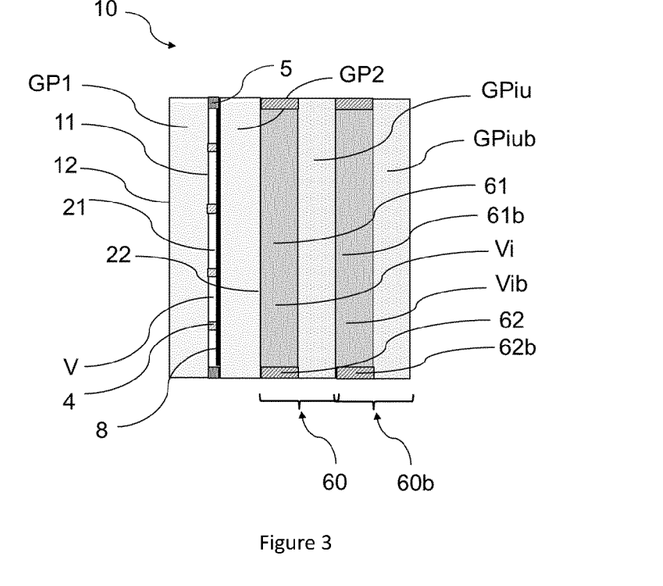
FIG. 3 shows a cross sectional view of a fire resistant vacuum insulating assembly according to a further embodiment of the present invention comprising one vacuum insulating glazing unit and two intumescent units.

FIG. 3 provides an illustration of this embodiment wherein a FR-VIG (10) comprises a VIG as already described with reference to FIG. 1 and two IU (60,60b). Each IU (60, 60b) comprises a layer of intumescent material (61,61b), an IU peripheral spacer (62,62b), an IU glass pane (GPiu,GPiub) and an intumescent unit volume (Vi,Vib). The first intumescent unit (60) is positioned next to the VIG and therefore, its layer of intumescent material (61) and its IU peripheral spacer (62) are facing and are in contact with the outer pane face (22) of GP2. The second IU (60b) is positioned next to the first intumescent unit (60) and therefore its layer of intumescent material (61b) and its IU peripheral spacer (62b) are also facing the outer pane face (22) of GP2 but are in contact with the GPiu of the first intumescent unit (60).

In a fifth particular embodiment of the invention, the layer of intumescent material and the IU peripheral spacer of the FR-VIG are facing and are in contact with an outer pane face (12,22) of GP1 or GP2 and the FR-VIG further comprises:
- an additional glass pane, GP4;
- an additional set of discrete pillars positioned between the intumescent unit glass pane and GP4, maintaining a distance between them;
- an additional hermetically bonding seal sealing the distance between the intumescent unit glass pane and the additional glass pane GP4 over a perimeter thereof;
- an additional internal volume, Vb, defined by the intumescent unit glass pane and the additional glass pane GP4 and closed by the other hermetically bonding seal and wherein there is an absolute vacuum of pressure of less than 0.1 mbar.

In this embodiment, a second VIG is hence formed comprising GP4, the IU glass pane, the additional set of discrete pillars, the additional hermetically bonding seal and the internal volume Vb. The IU glass pane is at the same time a glass pane of the intumescent unit and of the second VIG.

The FR-VIG of this variant can for instance be obtained by joining two VIG's with a layer of intumescent material and an intumescent unit peripheral spacer.

In the embodiments of the invention where the FR-VIG comprises several intumescent units, the layers of intumescent materials can be the same or different. A few non exhaustive examples of the use of different layers of intumescent materials are FR-VIG with layers of hydrated alkali metal silicates of different compositions, FR-VIG with layers of organic hydrogels of different compositions, FR-VIG with some layers of hydrated alkali metal silicates and some of organic hydrogels. When several intumescent units are present, the layers of intumescent materials preferably are all encompassed by a IU peripheral spacer. They are all preferably layers of hydrated alkali metal silicate compositions with the same or different compositions.

In the embodiments of the present invention where the FR-VIG comprises several intumescent units, all the intumescent units are preferably facing the same glass pane of the VIG. In other words, the VIG is not sandwiched between intumescent units.

This is of particular interest when the FR-VIG is used to close an opening within a partition. This partition separates an exterior space from an interior space, typically a partition separating the exterior atmosphere from the interior space of a building. Indeed, in this case, the intumescent unit(s) must be protected from the external environment and from extreme temperatures. Hence the FR-VIG is preferably positioned such that the intumescent units are facing the interior space and the VIG is facing the exterior atmosphere. For the same reason, a FR-VIG comprising a single intumescent unit used to close an opening of partition separating the exterior atmosphere from the interior space of a building is preferably positioned with the intumescent unit facing the interior space and the VIG facing the exterior atmosphere.

The FR-VIG of the invention may also comprise at one or both extremities one or more additional glass panes laminated by polymer interlayer(s). Polymer interlayers have been described supra. This is particularly advantageous to improve safety performances such as anti-burglary and anti-bullet performances, protection against defenestration.

Figure 4:
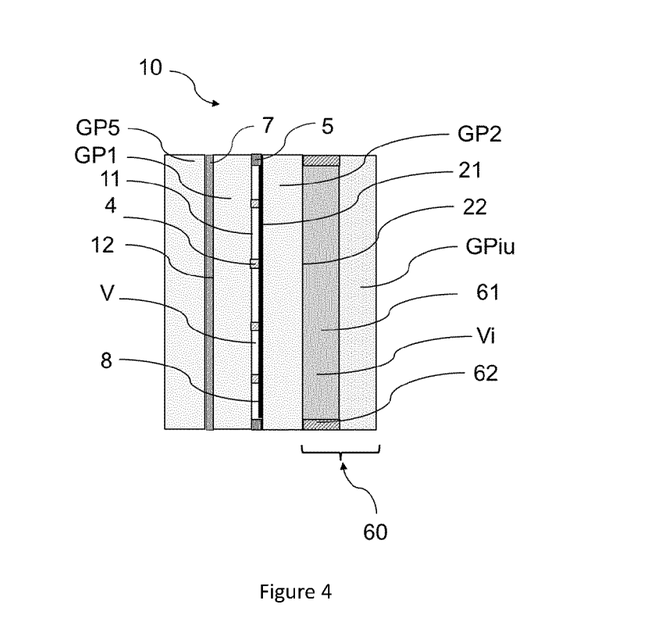
FIG. 4 shows a cross sectional view of a fire resistant vacuum insulating assembly according to a further embodiment of the present invention comprising one intumescent unit and one vacuum insulating glazing unit protected by an additional glass pane laminated thereto by a polymer interlayer.

FIG. 4 provides an illustration of this embodiment wherein a FR-VIG (10) comprises a VIG and one IU (60) as previously described with reference to FIG. 1. The outer pane face (12) of GP1 is further laminated to an additional glass pane, GP5, by an interlayer polymer (7). The intumescent unit (60) comprises a layer of intumescent material (61) and an IU peripheral spacer (62), both being in contact on one side, with the outer pane face (22) of GP2 and on the other side, with the intumescent unit glass pane (GPiu).

In a preferred embodiment of the present invention, the inner pane face of the first and/or second glass pane of at least one VIG is provided with a coating such as a heat ray reflection coating or a low-E coating. It is for instance illustrated by the coating (8) in FIGS. 1 and 2.

The number of intumescent units of the FR-VIG typically ranges from 1 to 6 and preferably from 1 to 4.

The layer of intumescent material of the FR-VIG according to the invention is typically obtained by a process comprising the steps of:
preparing an intumescent material precursors mixture,
pouring the mixture into the intumescent unit volume, Vi,
hardening the mixture to form the layer of intumescent material.

As previously described, the intumescent material precursors mixture may be a hydrated alkali metal silicate precursors mixture or organic hydrogel precursors mixture. This process is particularly suitable for hydrated alkali metal silicate precursors mixtures.

The step of preparing an intumescent material precursors mixture may be performed by any method known to the skilled person. The composition of the intumescent material precursors mixture is as described supra. The precursors may for instance be introduced via flow meters into a mixing tank.

The process may optionally comprise a partial dehydration step of the mixture between the step of preparing the mixture and the step of pouring it into the intumescent unit volume. This step aims at reaching a suitable water content in the intumescent material precursors mixture as described supra.

The mixture after the optional dehydration is sufficiently stable at ordinary ambient temperature conditions. It can be stored for several hours, or even days if necessary by cooling, without the risk of formation of a gel. It is possible to use this stability to eliminate bubbles that may have appeared during the preparation of the mixture. The removal of bubbles can take place simply by leaving the mixture at rest or by any known technique such as the use of ultrasound or degassing under partial pressure, for example.

The mixture is in a next step poured into the intumescent unit volume, Vi, that will later encompass the layer of intumescent material. The IU peripheral spacer tightly adheres on one side on the GPiu and on the other side to another glass pane of the assembly, which may for instance be the first (GP1) or the second (GP2) glass pane of the VIG or the IU glass pane of another intumescent unit or one of the additional glass panes depending on the configuration of the assembly.

For instance in FIG. 1, the other glass pane is GP2. In FIG. 2 the other glass pane is the additional glass pane GP3.

A typical distance separating the two glass panes is from 2 to 30 mm, preferably from 3 to 15 mm, more preferably from 3 to 8 mm.

The IU peripheral spacer typically comprises an opening to allow pouring the intumescent material precursors mixture into the intumescent unit volume. After the necessary quantity has been introduced, the mixture is then distributed or spread throughout the intumescent unit volume for instance thanks to a rotating table. The opening is then closed and sealed.

The intumescent material precursors mixture is then hardened. The hardening may for instance be performed in an oven at typically 60-90° C. for several hours to obtain a gel with sufficient hardness and form the layer of intumescent material.

In this process, the formed layer of intumescent material is encompassed by the IU peripheral spacer and consequently the layer of intumescent material does not extend up to the edges of the glass panes.

The person skilled in the art realizes that the present invention by no means is limited to the preferred embodiments described above. On the contrary, many modifications and variations are possible within the scope of the appended claims. It is further noted that the invention relates to all possible combinations of features, and preferred features, described herein and recited in the claims.

NUMERAL REFERENCES

| Ref.# | Feature |
| --- | --- |
| 10 | Fire resistant vacuum insulating glazing assembly |
| 11 | Inner pane face of the first glass pane |
| 12 | Outer pane face of the first glass pane |
| 21 | Inner pane face of the second glass pane |
| 22 | Outer pane face of the second glass pane |
| GP1 | First glass pane |
| GP2 | Second glass pane |
| GP3, GP4, GP5 | Additional glass pane |
| 4 | Discrete pillar |
| 5 | Hermetically bonding seal |
| 60, 60b | Intumescent unit |
| GPiu, GPiub | IU glass pane |
| 62, 62b | IU peripheral spacer |
| 61, 61b | Layer of intumescent material |
| 7 | Polymer interlayer |
| 8 | Coating |
| V | Internal volume |
| Vi, Vib | Intumescent unit volume |

The invention claimed is:

1. A fire resistant vacuum insulating glazing assembly comprising:
at least one vacuum insulating glazing unit comprising:
a first glass pane having an inner pane face and an outer pane face, and a second glass pane having an inner pane face and an outer pane face;
a set of discrete pillars positioned between the first and second glass panes, maintaining a distance between the first and the second glass panes;
a hermetically bonding seal sealing the distance between the first and second glass panes over a perimeter thereof;
an internal volume, V, defined by the first and second glass panes and closed by the hermetically bonding seal, wherein there is a vacuum of absolute pressure of less than 0.1 mbar; and wherein the inner pane faces face the internal volume; and
at least one intumescent unit comprising:
a layer of intumescent material;
an intumescent unit glass pane, GPiu; and
an intumescent unit peripheral spacer extending over a perimeter of the intumescent unit glass pane;
wherein the intumescent unit glass pane and the intumescent unit peripheral spacer define an intumescent unit volume, Vi, encompassing the layer of intumescent material, and
wherein the layer of intumescent material and the intumescent unit peripheral spacer are facing one of the outer pane faces of the first or second glass pane.

2. The fire resistant vacuum insulating assembly according to claim 1, wherein the layer of intumescent material and the intumescent unit peripheral spacer are in contact with the outer pane face.

3. The fire resistant vacuum insulating assembly according to claim 2, further comprising:
an additional glass pane, GP4;

an additional set of discrete pillars positioned between the intumescent unit glass pane GPiu and the additional glass pane GP4, maintaining a distance between them;

an additional hermetically bonding seal sealing the distance between the intumescent unit glass pane GPiu and the additional glass pane GP4 over a perimeter thereof; and an additional internal volume, Vb, defined by the intumescent unit glass pane GPiu and the additional glass pane GP4 and closed by the additional hermetically bonding seal, wherein there is an absolute vacuum of pressure of less than 0.1 mbar.

4. The fire resistant vacuum insulating assembly according to claim 1, wherein the layer of intumescent material and the intumescent unit peripheral spacer are separated from the outer pane face of the first or second glass pane by an additional glass pane, laminated by a polymer interlayer to the outer pane face of the first or second glass pane.

5. The fire resistant vacuum insulating assembly according to claim 4, wherein the polymer interlayer comprises a material selected from the group consisting of ethylene vinyl acetate (EVA), polyisobutylene (PIB), polyacetals, polyurethane (PU), polyvinyl chloride (PVC), polyesters, cyclo olefin polymers (COP), ionomers and/or an ultraviolet activated adhesives.

6. The fire resistant vacuum insulating assembly according to claim 1, wherein the layer of intumescent material is selected from the group consisting of a layer of hydrated alkali metal silicate composition, a layer of organic hydrogel, or a layer comprising both an organic hydrogel and a hydrated alkali metal silicate composition present in the form of a mixture.

7. The fire resistant vacuum insulating assembly according to claim 1, wherein the layer of intumescent material is a layer of hydrated alkali metal silicate composition.

8. The fire resistant vacuum insulating assembly according to claim 1, wherein the layer of intumescent material has a water content from 35% to 48% by weight of the layer.

9. The fire resistant vacuum insulating assembly according to claim 8, wherein the layer of intumescent material has a $SiO_2/M_2O$ molar ratio from 3 to 8.

10. The fire resistant vacuum insulating assembly according to claim 9, wherein the layer of intumescent material further comprises polyols in a proportion of less than 20% by weight of the layer.

11. The fire resistant vacuum insulating assembly according to claim 7, wherein the layer of intumescent material has a $SiO_2/M_2O$ molar ratio from 3 to 8.

12. The fire resistant vacuum insulating assembly according to claim 11, wherein the layer of intumescent material further comprises polyols in a proportion of less than 20% by weight of the layer.

13. The fire resistant vacuum insulating assembly according to claim 7, wherein the layer of intumescent material further comprises polyols in a proportion of less than 20% by weight of the layer.

14. The fire resistant vacuum insulating assembly according to claim 13, wherein the layer of intumescent material further comprises at least one silicate stabilizing agent.

15. The fire resistant vacuum insulating assembly according to claim 7, wherein the layer of intumescent material further comprises at least one silicate stabilizing agent.

16. The fire resistant vacuum insulating assembly according to claim 1, wherein the layer of intumescent material has a thickness from 2 to 30 mm.

17. The fire resistant vacuum insulating assembly according to claim 1, wherein at least one of the glass panes in contact with the layer of intumescent material is a thermally treated or chemically tempered glass pane.

18. The fire resistant vacuum insulating assembly according to claim 1, wherein the layer of intumescent material, is obtained by a process comprising:
preparing an intumescent material precursors mixture,
pouring the mixture into the intumescent unit volume, Vi, and
hardening the mixture to form the layer of intumescent material.

19. The fire resistant vacuum insulating assembly according to claim 18, wherein the process to obtain the layer of intumescent material further comprises partially dehydrating between preparing the intumescent material precursors mixture and pouring the mixture into the intumescent unit volume.

20. The fire resistant vacuum insulating assembly according to claim 1, wherein both of the glass panes in contact with the layer of intumescent material are thermally treated or chemically tempered glass panes.

21. The fire resistant vacuum insulating assembly according to claim 1, wherein the pillars consist of quartz glass, a ceramic material, or a hard metal material selected from the group consisting of iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, and duralumin.

* * * * *